United States Patent
Rephaeli et al.

(10) Patent No.: US 7,934,959 B2
(45) Date of Patent: May 3, 2011

(54) ADAPTER FOR PLUGGABLE MODULE

(75) Inventors: Shai Rephaeli, Kiryat Tivon (IL); Eyal Moshe Waldman, Kiryat Tivon (IL); Zvika Eyal, Kiryat Ata (IL); Ilya Margolin, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 12/825,365

(22) Filed: Jun. 29, 2010

(65) Prior Publication Data

US 2011/0081807 A1 Apr. 7, 2011

Related U.S. Application Data

(60) Provisional application No. 61/248,935, filed on Oct. 6, 2009.

(51) Int. Cl.
*H01R 25/00* (2006.01)
*H01R 13/66* (2006.01)
(52) U.S. Cl. .................. 439/638; 439/620.22
(58) Field of Classification Search .................. 439/638, 439/35, 61, 215, 620.21, 620.22
See application file for complete search history.

(56) References Cited

U.S. PATENT DOCUMENTS

| | | | | |
|---|---|---|---|---|
| 5,087,207 A * | 2/1992 | Byrne | | 439/215 |
| 5,766,020 A * | 6/1998 | Hughes | | 439/35 |
| 6,648,695 B1 * | 11/2003 | Wu | | 439/638 |
| 7,028,202 B2 * | 4/2006 | Long et al. | | 713/340 |
| 7,335,033 B1 | 2/2008 | Edwards, Jr. et al. | | |
| 2004/0018774 A1 * | 1/2004 | Long et al. | | 439/620 |
| 2004/0023559 A1 * | 2/2004 | Wu | | 439/638 |
| 2009/0093137 A1 * | 4/2009 | Badehi et al. | | 439/61 |

OTHER PUBLICATIONS

Mellanox Technologies, "Quad to Serial Small Form Factor Pluggable Adapter: Enabling VPI/40GigE Connectivity on 1/10GigE Infrastructure", USA 2010.
SFF Committee, "SFF-8431 Specifications for Enhanced Small Form Factor Pluggable Module SFP+", Revision 4.1 Jul. 6, 2009.
SFF Committee, "SFF-8436 Specification for QSFP+ Copper and Optical Modules", Revision 3.4, Nov. 12, 2009.
SFF Committee, "INF-8438i Specification for QSFP (Quad Small Formfactor Pluggable) Transceiver", Revision 1.0, Nov. 2006.

* cited by examiner

*Primary Examiner* — Chandrika Prasad
(74) *Attorney, Agent, or Firm* — D. Kligler I.P. Services Ltd.

(57) ABSTRACT

An adapter includes a mechanical frame, which is configured to be inserted into a four-channel Small Form-Factor Pluggable (SFP) receptacle and to receive inside the frame a single-channel SFP cable connector. First electrical terminals, held by the mechanical frame, are configured to mate with respective first pins of the receptacle. Second electrical terminals, held within the mechanical frame, are configured to mate with respective second pins of the connector. Circuitry couples the first and second electrical terminals so as to enable communication between the connector and one channel of the receptacle while terminating the remaining channels of the receptacle.

10 Claims, 6 Drawing Sheets

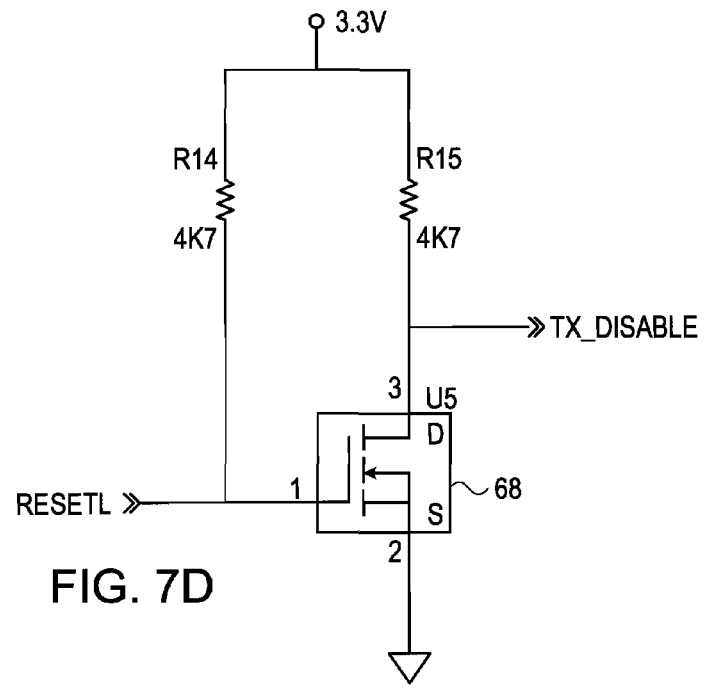
FIG. 7D
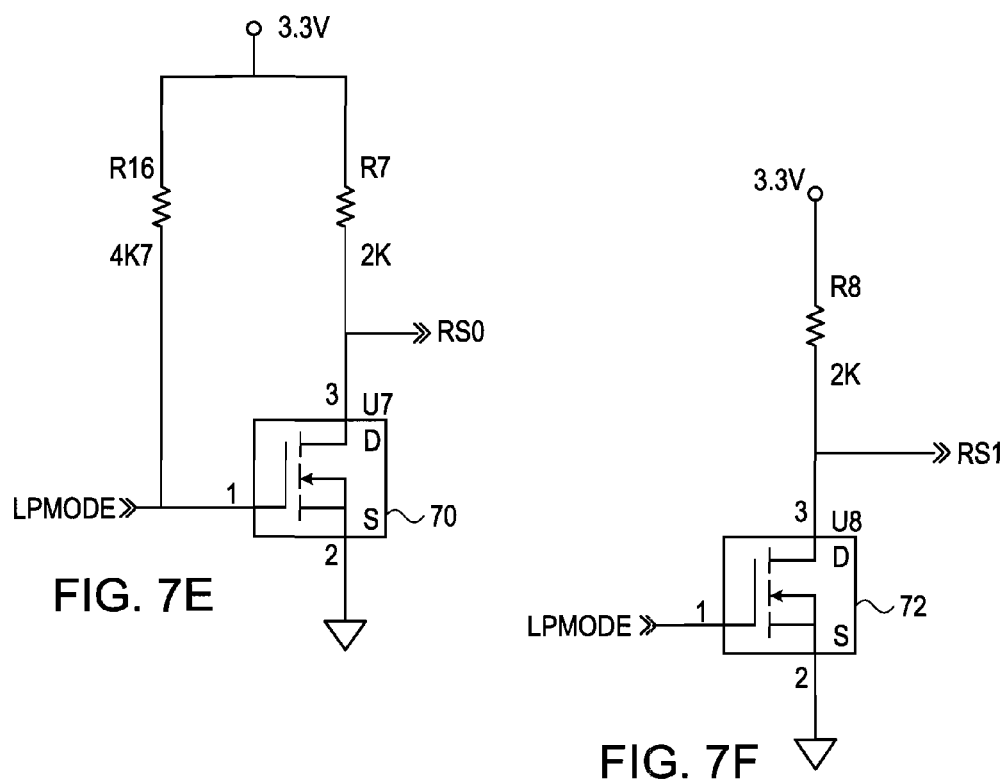
FIG. 7E
FIG. 7F

ADAPTER FOR PLUGGABLE MODULE

CROSS-REFERENCE TO RELATED APPLICATION

This application claims the benefit of U.S. Provisional Patent Application 61/248,935, filed Oct. 6, 2009, which is incorporated herein by reference.

FIELD OF THE INVENTION

The present invention relates generally to data communications, and specifically to adapters for bridging between connectors of different types.

BACKGROUND OF THE INVENTION

Small Form-factor Pluggable (SFP) modules are used in various telecommunication and data networking applications to interface between a printed circuit board in a network device and a network cable (which may be electrical or fiberoptic). Typically, the SFP receptacle is mounted on the printed circuit board with appropriate electrical connections to the circuit traces on the board, and a connector at the end of the cable plugs into the receptacle. The connector itself commonly contains signal conversion circuitry and is therefore referred to as a "transceiver."

The mechanical and electrical characteristics of various SFP modules have been defined by industry organizations. For example, the SFP+ specification defines hot-pluggable modules that may be used at data rates up to 10 Gb/s. Details of these modules have been set forth by the SFF Committee in the SFF-8431 Specifications for Enhanced Small Form Factor Pluggable Module SFP+ (Revision 4.1, Jul. 6, 2009), which is incorporated herein by reference. This specification, as well as other SFP specifications, is available at ftp.seagate.com/sff.

Quad Small Form-factor Pluggable (QSFP) modules are used in similar applications to the SFP modules described above and support four parallel communication channels at 10 Gb/s. The mechanical and electrical characteristics of QSFP modules are described in the SFF-8436 Specification for QSFP+Copper and Optical Modules (Revision 3.4, November, 2009), which is also incorporated herein by reference.

U.S. Pat. No. 7,335,033, whose disclosure is incorporated herein by reference, describes a form factor converter configured to concurrently connect to a circuit board module and a small form factor transceiver. The form factor converter includes an exterior portion defining a large form factor to fit within the device mounting section of the circuit board module, and an interior portion defining a small form factor location to receive at least a portion of a small form factor transceiver.

SUMMARY

Embodiments of the present invention provide adapters and methods that enable a single-channel connector to be plugged into a multi-channel receptacle.

There is therefore provided, in accordance with an embodiment of the present invention, an adapter, including a mechanical frame, which is configured to be inserted into a four-channel Small Form-Factor Pluggable (SFP) receptacle and to receive inside the frame a single-channel SFP cable connector. First electrical terminals, held by the mechanical frame, are configured to mate with respective first pins of the receptacle. Second electrical terminals, held within the mechanical frame, are configured to mate with respective second pins of the connector. Circuitry couples the first and second electrical terminals so as to enable communication between the connector and one channel of the receptacle while terminating the remaining channels of the receptacle.

In a disclosed embodiment, the four-channel SFP receptacle is a QSFP receptacle, and the single-channel SFP connector is a SFP+ connector, and the circuitry includes active circuit elements for linking SFP+ control lines in the cable to QSFP control lines in the receptacle. Typically, the first and second electrical terminals mate with the respective first and second pins by engagement of respective edge connectors.

In some embodiments, the frame includes a unitary member having an outer size and shape conforming to the receptacle and an inner size and shape conforming to the connector.

There is also provided, in accordance with an embodiment of the present invention, a method for communication, including inserting an adapter, as described above, into a four-channel Small Form-Factor Pluggable (SFP) receptacle. A single-channel SFP cable connector is inserted into the adapter. The present invention will be more fully understood from the following detailed description of the embodiments thereof, taken together with the drawings in which:

BRIEF DESCRIPTION OF THE DRAWINGS

FIGS. 7A-7F are electrical schematic diagrams showing adapter circuitry, in accordance with an embodiment of the present invention.

DETAILED DESCRIPTION OF EMBODIMENTS

The mechanical characteristics and pinout of the QSFP module differ from those of other SFP modules, such as SFP+. Therefore, a cable with a SFP+ connector cannot normally be plugged into a QSFP receptacle. An embodiment of the present invention, described in detail hereinbelow, overcomes this incompatibility so as to allow interworking of QSFP receptacles with SFP+ connectors. Specifically, this embodiment provides an adapter that fits inside the QSFP cage (the mechanical envelope of the receptacle) and accommodates the SFP+ connector, both mechanically and electrically, thus enabling cables that are terminated with SFP+ connectors to be plugged into QSFP receptacles. The adapter contains circuitry that enables communication between the connector and one channel of the four channels of the receptacle, while terminating the remaining channels of the receptacle.

Figure 1:
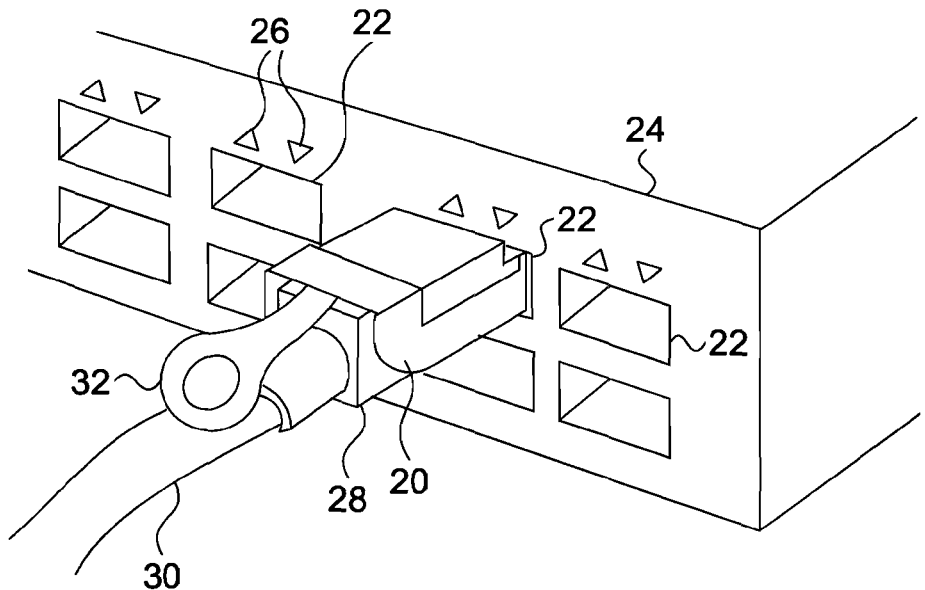
FIG. 1 is a schematic, pictorial illustration showing a connector plugged into a receptacle via an adapter, in accordance with an embodiment of the present invention.

FIG. 1 is a schematic, pictorial illustration showing a SFP+ connector 28 plugged into an adapter 20, which is in turn plugged into a QSFP receptacle 22 in a panel 24 of a communication device, in accordance with an embodiment of the present invention. In this example, panel 24 contains multiple receptacles 22 with respective indicator lamps 26 and other controls, as are known in the art. Some of the QSFP receptacles will receive cables with QSFP plugs (not shown in the figure). In some cases, however, it may be desired to couple the console to legacy equipment, for example, that contains only SFP+ sockets, or it may be desired to use legacy SFP+ cables when the full bandwidth of QSFP is not needed. For these sorts of cases, adapter 20 permits a cable 30 with SFP+ connector 28 to mate with receptacle 22. A release mechanism, such as a pull tab 32 or a lever, can be used to remove the adapter from the receptacle when it is no longer needed.

Figure 2:
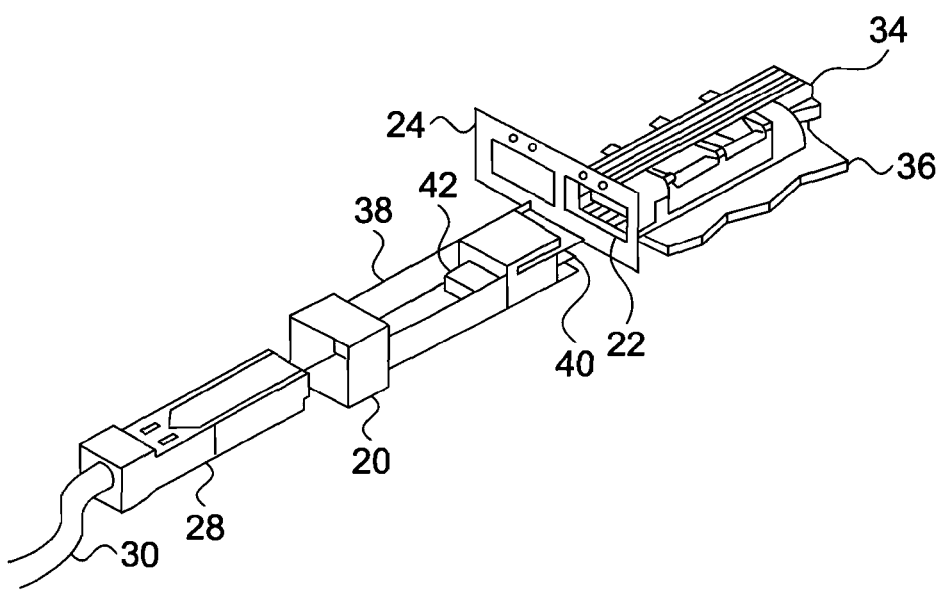
FIG. 2 is a schematic, exploded view of the connector, adapter, and receptacle of FIG. 1.

FIG. 2 is a schematic, exploded view of plug 28, adapter 20 and receptacle 22, in accordance with an embodiment of the present invention. Receptacle 22 comprises a cage 34, which is mounted on a printed circuit board 36 behind panel 24. Adapter 20 comprises a mechanical frame 38 having outer dimensions that are similar or identical to those of a QSFP connector, as well as outer electrical terminals 40 that mate with pins in cage 34 (not shown in this figure) in the same manner as those of a QSFP connector. At the same time, adapter 20 has inner dimensions that are similar or identical to those of a SFP+ receptacle, and adapter 20 contains inner electrical terminals 42 that mate with the pins on SFP+ connector 28 (not shown in this figure). Thus, connector 28 can fit into and mate with adapter 20.

Connector 28 typically contains a suitable electrical or fiberoptic transceiver, in accordance with SFP+ specifications. Adapter 20 contains electrical circuitry (shown and described further hereinbelow) that couples the pins of connector 28 to appropriate pins of receptacle 22 so as to connect the signals in a cable 30 to the appropriate conductors (not shown) on board 36. (The term "cable" is used broadly in the context of the present patent application to include not only electrical cables, but also fiberoptics.) Adapter 20 thus permits interworking of the SFP+ plug with the QSFP receptacle.

Mechanical frame 38 is made up of one or two unitary members, as can be seen in FIG. 2 and in the figures that follow. These mechanical elements are "unitary" in the sense that they have no separate interior and exterior portions. Rather, the frame comprises a unitary wall, which is typically molded or otherwise formed so that the inner size and shape are compatible with SFP+, while the outer size and shape are compatible with QSFP. The unitary construction makes adapter 20 simple and inexpensive to manufacture, as well as reliable in use.

Figure 3:
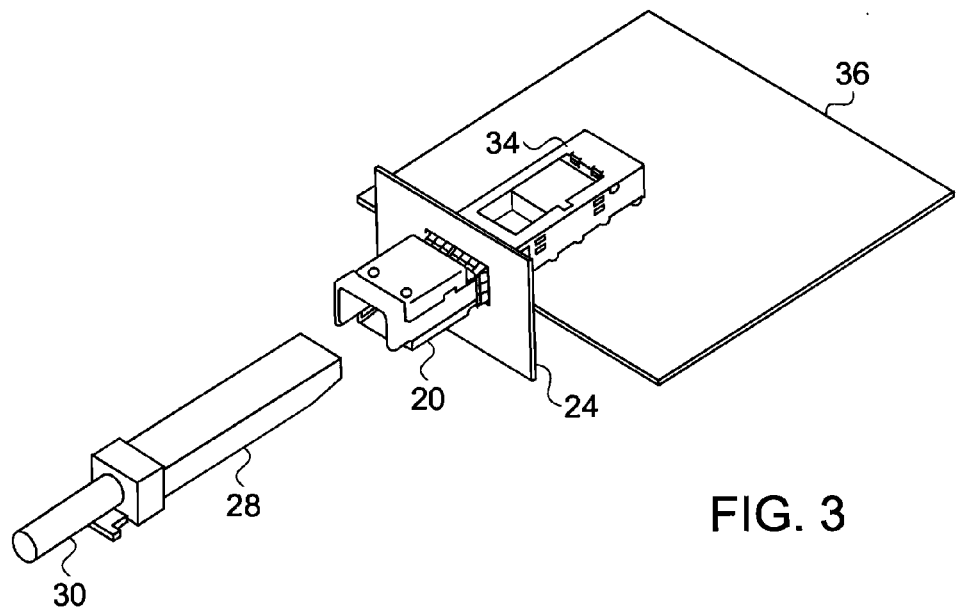
FIG. 3 is a schematic, pictorial illustration showing insertion of a connector into an adapter that is plugged into a receptacle, in accordance with an embodiment of the present invention.
Figure 4:
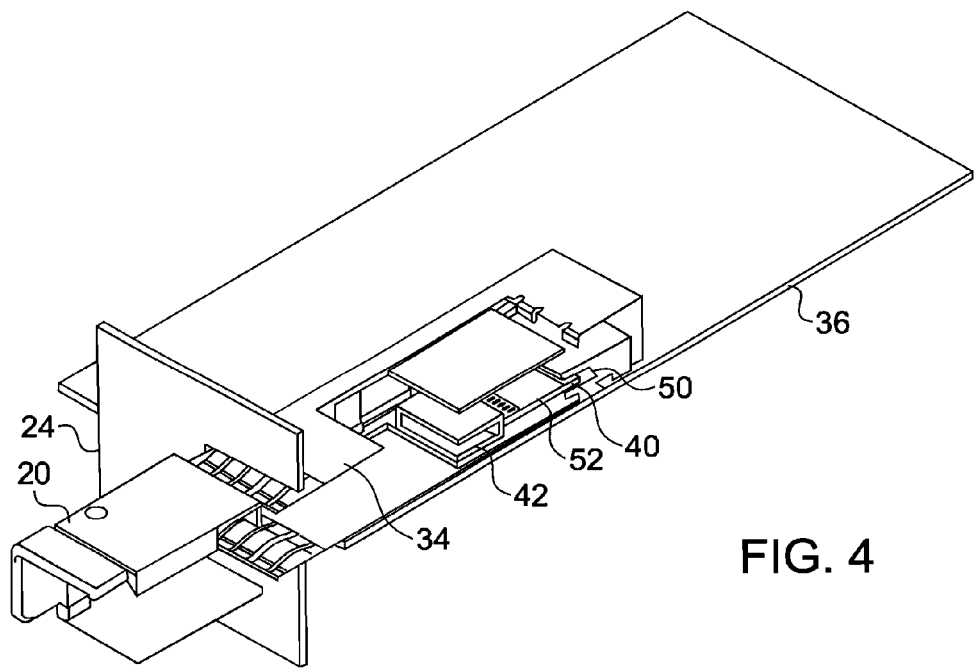
FIG. 4 is a schematic cutaway view of an adapter in a receptacle, in accordance with an embodiment of the present invention.
Figure 5:
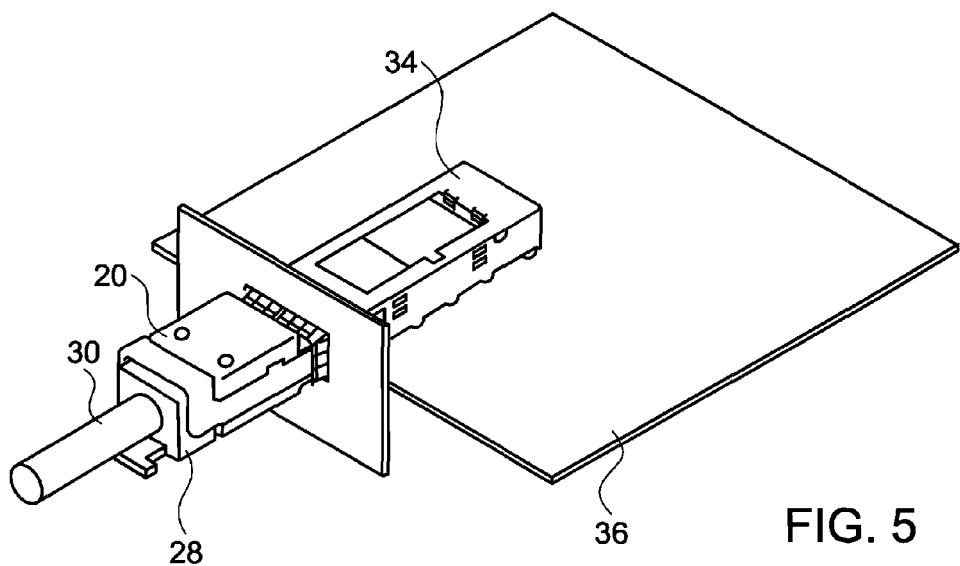
FIG. 5 is a schematic, pictorial illustration showing a connector plugged into an adapter in a receptacle, in accordance with an embodiment of the present invention.
Figure 6:
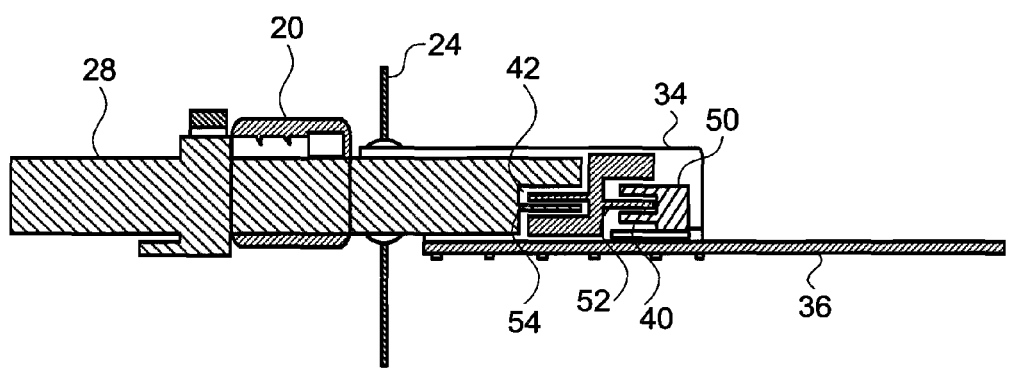
FIG. 6 is a schematic, sectional view of the connector module, adapter, and receptacle of FIG. 5.

Reference is now made to FIGS. 3-6, which schematically show different views of adapter 20, receptacle 22 and plug 28, in accordance with an embodiment of the present invention. FIG. 3 shows adapter 20 inserted into cage 34, in preparation for receiving plug 28. FIG. 4 is a cutaway view showing details of adapter 20 and cage 34 in this situation. FIG. 5 shows the next stage, in which connector 28 is plugged into adapter 20 inside cage 34, and FIG. 6 is a sectional view of the connector, adapter and cage of FIG. 5.

Adapter 20 contains an edge connector, which has terminals 42 for mating with pins 54 of a corresponding forward edge of SFP+ connector 28 when the connector is inserted into the adapter. A miniature circuit board 52 couples terminals 42 to terminals 40 at the outer edge of adapter 20. The outer edge of the adapter is inserted into an edge connector 50 of QSFP cage 34, so that terminals 40 mate with the pins of the edge connector. The conductors on board 52, which are shown schematically in FIGS. 7A-7F, thus couple the appropriate pins 54 of connector 28 to the corresponding pins in connector 50 in cage 34, with intervening buffer circuits as needed, in order to permit interworking between the SFP+ and QSFP standards.

FIGS. 7A-7F are electrical schematic diagrams showing the electrical connections and components on board 52 in adapter 20, in accordance with an embodiment of the present invention. The meanings of the signal names in the figures, along with the relevant signal parameters, are defined in the SFP+ and QSFP specifications that are cited above in the Background section.

Figure 7A:
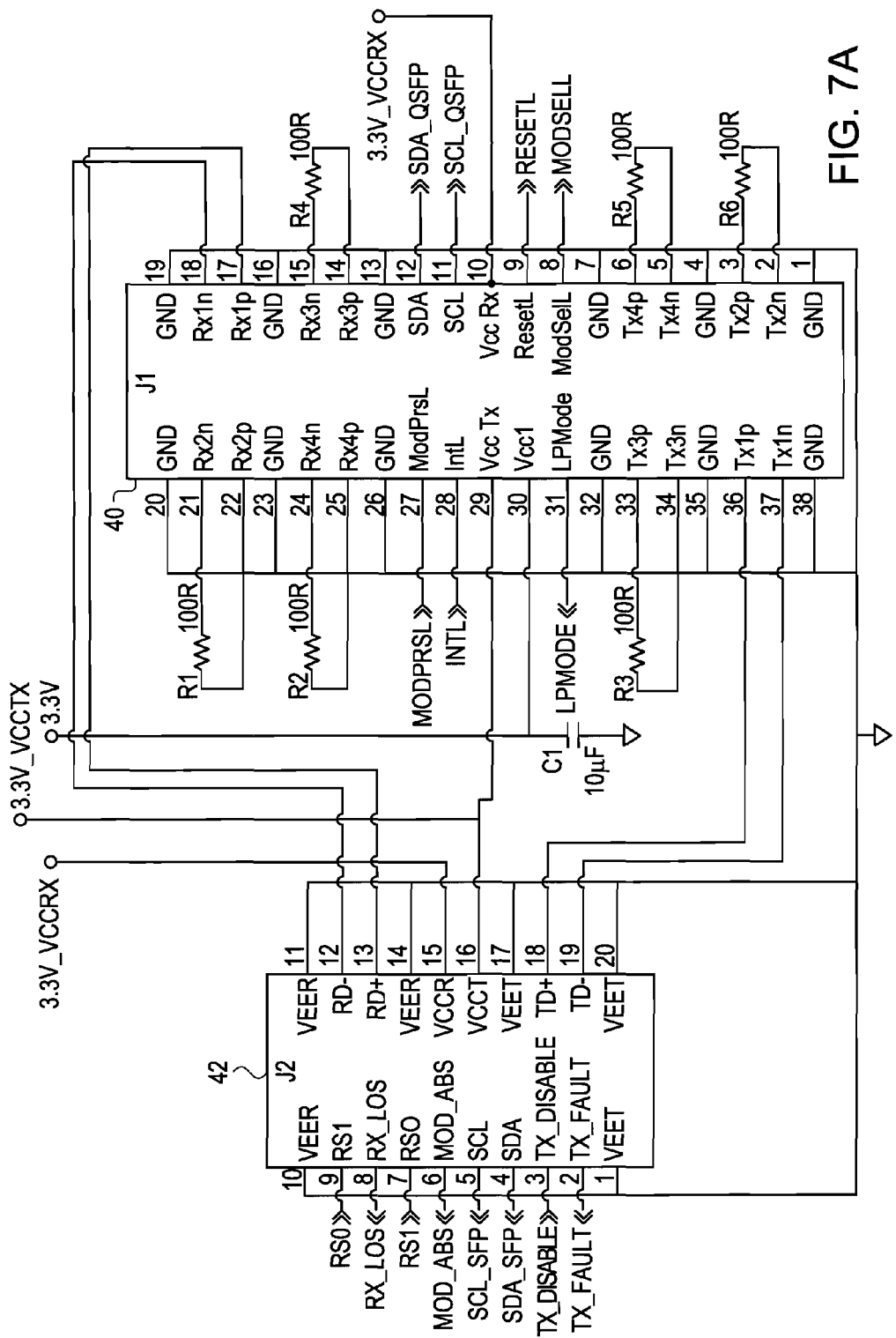
Figure 7B:
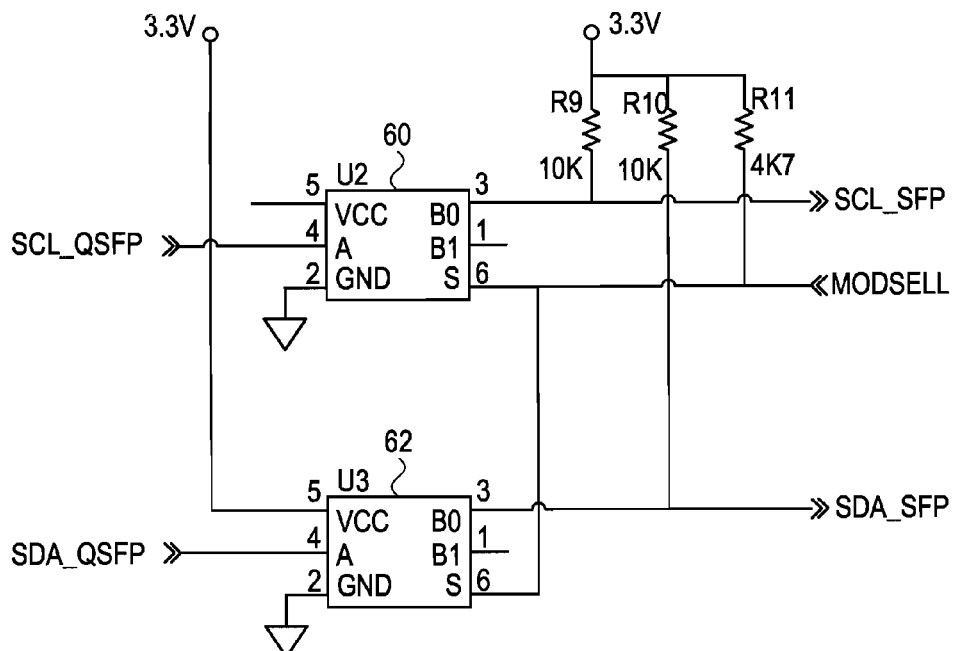
Figure 7C:
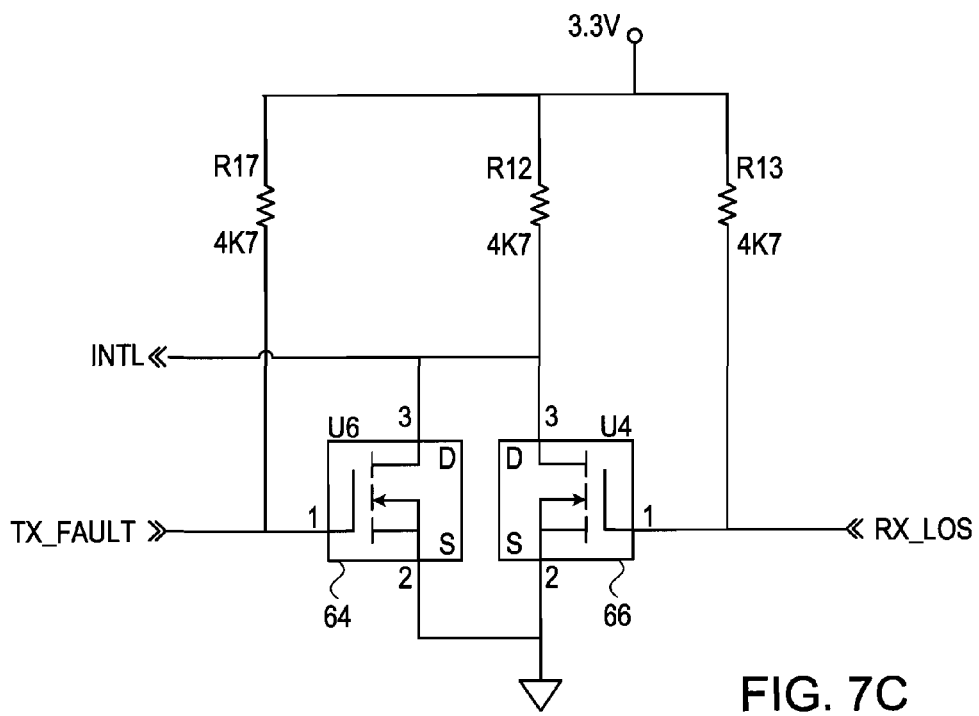

As shown in FIG. 7A, terminals 40 on connector J1 of board 52 connect to the QSFP edge connector in receptacle 34, while terminals 42 on edge connector J2 receive the pins at the edge of SFP+ connector 28. One of the four transmit/receive differential channels in the QSFP receptacle (labeled with the notations Rx1$n$/Rx1$p$ and Tx1$n$/Tx1$p$) is connected to the single transmit/receive channel of the SFP+ connector. Unused signals on the SFP+ plug are connected to ground or otherwise terminated on the QSFP receptacle, while voltage lines are suitably connected between the plug and receptacle. The three unused transmit/receive channels of the QSFP receptacle are likewise terminated.

FIGS. 7B-7F show adapter circuits on board 52, comprising active circuit elements for linking the SFP+ and QSFP control lines notwithstanding the differences between the two specifications. Analog switches 60 and (such as Fairchild Semiconductor NC7SB3157 switches) interface between the SCL and SDA clock and data lines of the SFP+ and QSFP standards under control of the QSFP module select (MOD-SEL) line. Transistors 64, 66, 68, 70 and 72 (such as ON Semiconductor NTS4001NT1G MOSFET devices) perform various buffering functions, such as coupling the QSFP interrupt line (INTL) to the SFP+ transmitter fault (TX-FAULT) and receiver loss of signal (RX_LOS) lines; coupling the QSFP module reset line (RESETL) to the SFP+ transmit disable line (TX_DISABLE); and coupling the QSFP low power mode control line (LPMODE) to the optional SFP+ rate select lines (RS0 and RS1).

Although the above figures show a particular implementation of the mechanical and electrical connections used in SFP+/QSFP adapter 20, variations on this implementation will be apparent to those skilled in the art, after reading the above disclosure, and are considered to be within the scope of the present invention. More generally, the principles of the present invention may similarly be applied in adapting other single-channel SFP connectors to mate with a four-channel SFP receptacle.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An adapter, comprising:
   a mechanical frame, which is configured to be inserted into a four-channel Small Form-Factor Pluggable (SFP) receptacle and to receive inside the frame a single-channel SFP cable connector;
   first electrical terminals, held by the mechanical frame and configured to mate with respective first pins of the receptacle;

second electrical terminals, held within the mechanical frame and configured to mate with respective second pins of the connector; and circuitry coupling the first and second electrical terminals so as to enable communication between the connector and one channel of the receptacle while terminating the remaining channels of the receptacle.

2. The adapter according to claim 1, wherein the four-channel SFP receptacle is a QSFP receptacle, and the single-channel SFP connector is a SFP+ connector.

3. The adapter according to claim 2, wherein the circuitry comprises active circuit elements for linking SFP+ control lines in the cable to QSFP control lines in the receptacle.

4. The adapter according to claim 1, wherein the frame comprises a unitary member having an outer size and shape conforming to the receptacle and an inner size and shape conforming to the connector.

5. The adapter according to claim 1, wherein the first and second electrical terminals mate with the respective first and second pins by engagement of respective edge connectors.

6. A method for communication, comprising:
    inserting an adapter into a four-channel Small Form-Factor Pluggable (SFP) receptacle, the adapter comprising:
        a mechanical frame, which is configured to be inserted into the receptacle and to receive inside the frame a single-channel SFP cable connector;
        first electrical terminals, held by the mechanical frame and configured to mate with respective first pins of the receptacle;
        second electrical terminals, held within the mechanical frame and configured to mate with respective second pins of the connector; and
        circuitry coupling the first and second electrical terminals so as to enable communication between the connector and one channel of the receptacle while terminating the remaining channels of the receptacle; and
    inserting the single-channel SFP cable connector into the adapter.

7. The method according to claim 6, wherein the four-channel SFP receptacle is a QSFP receptacle, and the single-channel SFP connector is a SFP+ connector.

8. The method according to claim 7, wherein the circuitry comprises active circuit elements for linking SFP+ control lines in the cable to QSFP control lines in the receptacle.

9. The method according to claim 6, wherein the frame comprises a unitary member having an outer size and shape conforming to the receptacle and an inner size and shape conforming to the connector.

10. The method according to claim 6, wherein the first and second electrical terminals mate with the respective first and second pins by engagement of respective edge connectors.

\* \* \* \* \*